United States Patent [19]

Wautier et al.

[11] Patent Number: 4,853,207

[45] Date of Patent: Aug. 1, 1989

[54] PROCESS FOR THE MANUFACTURE OF VITREOUS METAL OXIDES

[75] Inventors: Henri Wautier, Braine-le-Comte; Franz Legrand, Quaregnon; Luc Lerot, Brussels, all of Belgium

[73] Assignee: Solvay & Cie (Société, Brussels, Belgium

[21] Appl. No.: 16,373

[22] Filed: Feb. 19, 1987

[30] Foreign Application Priority Data

Feb. 24, 1986 [FR] France .................................. 86 02618

[51] Int. Cl.$^4$ ........................................... C01B 13/14
[52] U.S. Cl. ..................................... 423/592; 423/593; 423/594; 423/595; 423/596; 423/598; 423/599; 423/600; 423/604; 423/605; 423/606; 423/607; 423/608; 423/610; 423/617; 423/618; 423/619; 423/622; 423/630; 423/635; 423/641; 501/12
[58] Field of Search ............... 423/592, 604, 605, 606, 423/608, 617, 618, 630, 635, 593, 594, 595, 598, 600, 607, 609, 610, 619, 622, 596, 599, 641; 501/12

[56] References Cited

U.S. PATENT DOCUMENTS

| | | | |
|---|---|---|---|
| 3,394,990 | 7/1968 | Weingaerther et al. | 423/630 |
| 3,944,658 | 3/1976 | Yoldas | 423/630 |
| 4,275,052 | 6/1981 | Ryu | 423/628 |
| 4,387,085 | 6/1983 | Fanelli et al. | 423/630 |
| 4,532,072 | 7/1985 | Segal | 423/630 |
| 4,543,341 | 9/1985 | Barringer et al. | 501/1 |

FOREIGN PATENT DOCUMENTS

| | | | |
|---|---|---|---|
| 0072995 | 8/1981 | European Pat. Off. | 423/630 |
| 1053481 | 3/1959 | Fed. Rep. of Germany | 423/630 |
| 1201794 | 1/1960 | France | 423/630 |
| 827392 | 2/1960 | United Kingdom | 423/630 |
| 843356 | 4/1960 | United Kingdom | 423/630 |

OTHER PUBLICATIONS

The Condensed Chemical Dictionary 9th edition, Hawley, Van Nostrand Reinhold Company, NY, 1977, p. 662.

Huber, W., *Titrations in Nonaqueous Solvents*, Academic Press, (1967), p. 220.

S. R. Gurkovich & J. B. Blum, "Crystallization of Amorphous Lead-Titante Prepared by a Sol-Gel Process", Ferroelectrics, vol. 62, (1985), pp. 189–194.

S. Sakka, "Gel Method for Making Glass", *Treatise on Materials Science and Technology*, vol. 22, (1982), pp. 129–167.

S. R. Gurkovich & J. B. Blum, "Preparation of Monolithic Lead-Titanate by a Sol-Gel Process", Ultrastruct. Process. Ceram . . . Proc. Int. Conf., (1984), pp. 152–160.

*Primary Examiner*—Robert L. Stoll
*Assistant Examiner*—Paige C. Harvey
*Attorney, Agent, or Firm*—Spencer & Frank

[57] ABSTRACT

Process for the manufacture of vitreous metal oxides in which a metal alcoholate derived from an alcohol, the pka of which is less than 15.74, is hydrolysed with an aqueous medium, the pH of which is greater than 1.5. The process is applied especially to the manufacture of vitreous zirconium oxide.

12 Claims, No Drawings

PROCESS FOR THE MANUFACTURE OF VITREOUS METAL OXIDES

BACKGROUND OF THE INVENTION

The subject of the invention is the manufacture of vitreous metal oxides.

A process for manufacturing vitreous metal oxides according to which a metal alcoholate is subjected to hydrolysis is known. This known process is commonly called the "sol-gel process" (TREATISE ON MATERIALS SCIENCE AND TECHNOLOGY, Vol. 22, 1982, Academic Press. Inc.—S. SAKKA: 37 Gel Method for Making Glass", pages 129 to 167). It generally implies that the hydrolysis is carried out in an acid medium, in order to avoid a precipitation of the metal oxide (ibid. page 132); the production of high acidity in the reaction medium (pH between 1 and 2.5) by the addition of inorganic acids such as hydrochloric acid or nitric acid (U.S. Pat. No. 4,476,156, column 4, line 65 to column 5, line 1) is recommended.

Vitreous lead titanate has been manufactured by means of a process in which titanium isopropoxide was first reacted with lead acetate dissolved in methoxyethanol, the resulting alcoholate was dissolved in methoxyethanol and it was subjected therein to hydrolysis using a solution of methoxyethanol and water containing nitric acid (Ultrastruct. Process. Ceram. Glasses, Compos. (Proc. Int. Conf. (1984), pages 152–160)). In this known process, the solution of methoxyethanol and water employed contained 0.002 mole $HNO_3$/mole of water; the strict necessity to employ more than 0.0005 mole $HNO_3$/mol of water is stressed (page 155).

The presence of strong inorganic acids in the reaction medium is a source of disadvantages. It is especially a source of impurities in the metal oxide glass, which have an adverse effect on its transparency. In the case where the vitreous metal oxide is formed in situ on a substrate, the inorganic acid is likely to cause corrosion of the substrate. Moreover, the presence of inorganic acid implies that the equipment used for the hydrolysis reaction is made of expensive materials, which are resistant to corrosion by acids.

SUMMARY OF THE INVENTION

The invention remedies these drawbacks by providing an improved process for the manufacture of vitreous metal oxides which makes it possible to avoid the use of inorganic acids. In fact, it has been found that by making a judicious choice of alcoholate, it is possible to avoid an inorganic acid without deteriorating the properties of the vitreous metal oxide.

Consequently, the invention relates to a process for the manufacture of vitreous metal oxides in which a metal alcoholate is hydrolysed. According to the invention, an alcoholate derived from an alcohol, the pKa of which is less than 15.74, is employed, and the hydrolysis is carried out in an aqueous medium, the pH of which is greater than 1.5.

In the process according to the invention, metal alcoholate denotes any compound in which a metal is linked to at least one hydrocarbon group through an oxygen atom.

According to the invention, the alcoholate is chosen from amongst those deriving from an alcohol the pKa of which is less than 15.74 which is the generally agreed value for the pKa of pure water (W. HUBER - "Titrations in nonaqueous solvents"—1967—Academic Press.—page 220, table 1.9).

The preferred alcoholates are those which derive from alcohols, the pKa of which does not exceed 15.25, values between 12 and 15 being especially recommended.

Notwithstanding the above condition relating to pKa, all alcohols may be suitable for the preparation of the metal alcoholate. Within the scope of the invention, it is appropriate to give the term alcohol a quite general meaning, to include (unsubstituted and partially or totally substituted) phenols as well as unsubstituted or partially or totally substituted, unsaturated or saturated, cyclic or straight-chain aliphatic alcohols. Aliphatic alcohols such as, for example, trifluoroethanols are especially recommended.

Advantageous alcohols according to the invention are those derived from compounds of general formula:

$$R-O-R'OH$$

in which R and R' denote hydrocarbon groups.

Alkoxy alcoholates such as, for example, methoxyethanolates are especially recommended.

The hydrolysis serves for decomposing the alcoholate with water, to produce the hydrated metal oxide and an alcohol according to the following reaction mechanism:

$$M(OR)_n + nH_2O \rightarrow M(OH)_n + nROH$$

$$M(OH)_n \rightarrow MO_{n/2} + n/2\, H_2O$$

in which M and R denote a metal and a hydrocarbon group respectively.

According to the invention, an aqueous medium the pH of which is greater than 1.5 is employed for the hydrolysis.

The aqueous medium may be water as such, for example a natural water or an industrial water which has, if required, undergone conditioning treatment such as clarification, softening, deionization or distillation treatment. It may, if required, contain additives such as inorganic acids, especially strong acids such as nitric, hydrochloric, phosphoric and sulphuric acids. However, where appropriate, the concentration of inorganic acid in the aqueous medium should be adjusted so that its pH remains greater than 1.5, preferably at least equal to or greater than 2. In the case where the aqueous medium contains strong inorganic acids it is recommended that these are in quantities less than 0.002 mole per mole of water in the aqueous medium, quantities less than 0.0005 mole per mole of water being recommended. All other things being equal, it is preferred to carry out the hydrolysis in the absence of a strong inorganic acid. As a variant, the hydrolysis may be carried out, if required, in a basic medium.

The hydrolysis is carried out under conditions which are adjusted so as to cause gelling of the metal oxide and avoid precipitation. It can be carried out indifferently with an excess or a deficit of water relative to the quantity strictly required to decompose the entire amount of alcoholate. As a general rule, the optimum quantity of water which is appropriate to use depends on various parameters, especially on the metal alcoholate chosen and on the form sought for the gel which may, for example, be produced in the form of gelled mass, of fibres or of a film.

The gel collected at the end of the hydrolysis is subjected, in a manner known per se, to a thermal treatment adequate to convert it into glass. The conditions for the thermal treatment, especially the temperature and the duration, depend on various parameters such as the nature of the metal oxide to be produced and the form sought for the gel. These conditions must be worked out for each particular case, by a routine laboratory procedure.

According to one particular embodiment of the process according to the invention, it proved advantageous to employ the metal alcoholate and water for the hydrolysis in the form of organic solutions which are mixed in order to carry out the hydrolysis.

In this embodiment of the process according to the invention, identical or different organic solvents may be used for the alcoholate on the one hand, and for water on the other. In the case where the alcoholate and water are dissolved in different organic solvents, it is generally appropriate to choose miscible organic solvents. Alcohols and their derivatives are generally well suited, especially methanol, ethanol, n-propanol, isopropanol, n-butanol, isobutanol and alkoxy alcohols such as methoxyethanol.

The optimum levels of dilution of the alcoholate and water in their respective organic solvents depend on various factors, especially on the metal, the alcoholate, the solvents, the working temperature and the form desired for the gel; they must be determined for each particular case by a routine laboratory procedure.

In the implementation of this embodiment of the invention, it generally suffices to dissolve separately the metal alcoholate and water in their respective solvents and to then pour the organic solution of water into the organic solution of the alcoholate.

In a particular procedure for carrying out this embodiment of the invention, the organic solution of the metal alcoholate is an alcoholic solution which is obtained by dissolving an alcoholate derived from an alcohol the pKa of which is greater than 15.74 in an alcohol the pKa of which is less than 15.74. In this particular embodiment of the invention, the alcohols with pKa values less than and greater than 15.74 respectively may belong to the class comprising unsubstituted phenols, partially or totally substituted phenols and alcohols containing unsubstituted or partially or totally substituted, saturated or unsaturated, cyclic or straight-chain aliphatic groups. All other things being equal, it is preferred to choose the alcohol, the pKa of which is less than 15.74, from amongst ether-alcohols of general formula:

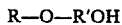

R—O—R'OH in which R and R' denote hydrocarbon groups.

Preferred ether-alcohols are those in which the R and R' groups are saturated aliphatic groups such as, for example, methyl, ethyl, n-propyl, isopropyl, n-butyl and isobutyl groups. Examples of such ether-alcohols are ethoxyethanol, methoxyethanol and isobutoxyethanol.

In the embodiment of the invention just described the alcohol, the pKa of which is greater than 15.74, may advantageously be chosen from amongst saturated aliphatic alcohols.

In this embodiment of the invention, the degree of dilution of the alcoholate in the alcohol, the pKa of which is less than 15.74, must be adequate for the hydrolysis to lead a gelling without precipitation of the metal oxide. In practice, however, there is no advantage in using an excessive degree of dilution; the optimum degree of dilution depends on several parameters among which are: the metal, the alcohols, the working temperature and the form sought for the gel. It must be worked out for each particular case.

In the procedure for the embodiment of the invention just described an organic solution of water is prepared, an alcoholate derived from an alcohol the pKa of which is greater than 15.74 is dissolved in an alcohol the pKa of which is less than 15.74 and the organic solution of water is poured into the alcoholic solution of the alcoholate.

An especially advantageous feature of the process according to the invention lies in the possibility of carrying out the hydrolysis in the absence of an inorganic acid, without risking precipitation.

The process according to the invention especially finds a valuable application in the production of oxides of metals of groups III and IV of the periodic table of elements, by the hydrolysis of the alcoholates of these metals; it finds an especially advantageous application in the production of vitreous metal oxides from metal oxides which are difficult to vitrify and which, in the sol-gel processes prior to the invention, necessarily involved the use of strong inorganic acids such as nitric and hydrochloric acids. The invention is advantageously applied in this way to the production of vitreous metal oxides formed from zirconium oxide, aluminum oxide, boron oxide and from mixtures of these oxides with themselves or with the other metal oxides.

DESCRIPTION OF THE PREFERRED EMBODIMENTS

The few examples, the description of which follows, serve to illustrate the invention.

In each of these examples, the following were prepared separately:

firstly, an organic solution containing at least one metal alcoholate; and secondly, an organic solution of water.

The organic solution of water was then poured into the organic solution of the alcoholate in a quantity sufficient to form a hydrated metal oxide by the hydrolysis of the metal alcoholate.

First Series of Trials (Reference)

Examples 1 and 2, the description of which follows, relate to trials in which the organic solution of the metal alcoholate was prepared exclusively from alcohols, the pKa of which is greater than 15.74.

Example 1

The organic solution of the metal alcoholate was obtained by diluting 0.1 mole of zirconium n-propoxide in 80 ml of ethanol. The operation was carried out under moisture-free conditions, in a chamber maintained under a dry nitrogen atmosphere. 4.82 ml of 70% nitric acid were added to the resulting organic solution, so as to obtain a molar ratio $HNO_3/Zr$ equal to 0.75.

The organic solution of water was obtained by diluting 3.4 ml of distilled water in 72 ml of ethanol.

The organic solution of water was poured into the alcoholate solution which was maintained stirred, at ambient temperature.

After 1 hour of maturing at ambient temperature, the reaction medium coagulated in the form of a gel.

Example 2

The organic solution of the metal alcoholate consisted of a 0.2 molar solution of zirconium n-butoxide in ethanol, without inorganic acid.

The organic solution of water consisted of a 0.7 molar solution of distilled water in ethanol.

The two solutions were mixed at 25° C., operating as in example 1. After mixing for approximately 20 seconds, a precipitate appeared, without gel formation.

Examples 1 and 2 show that, in the case where the metal alcoholate solutions are obtained from alcohols, the pKa of which is greater than 15.74, a strong inorganic acid must be added to it, for the hydrolysis to give rise to the formation of a gel.

Second Series of Trials (According to the Invention)

Examples 3 to 5, the description of which follows, relate to trials in which the organic solutions of the metal alcoholates were prepared from alcohols, the pKa of which is less than 15.74.

Example 3

The organic solution of the metal alcoholate was obtained by dissolving zirconium n-butoxide in 2,2,2-trifluoroethanol (pKa=12.37), at a rate of 0.2 mole of zirconium n-butoxide per liter of solution.

The organic solution of water consisted of a 0.7 molar solution of distilled water in 2,2,2-trifluoroethanol. Its apparent pH was determined by an electrochemical method using a glass electrode combined with an Ag-/AgCl electrode, of the Metrohm No. 6,024,100 model: pH=5.6.

The organic solution of water was poured into the organic solution of the alcoholate which was maintained stirred, at 25° C.

After a maturing period of a few days at ambient temperature in an open mold, the reaction mixture coagulated in the form of a transparent gel.

Example 4

The organic solution of the metal alcoholate was obtained by dissolving 0.1 mole of zirconium n-propoxide in 80 ml of 2-methoxy-1-ethanol (pKa=14.80), in a reactor maintained under an anhydrous nitrogen atmosphere.

The organic solution of water was obtained by dissolving 5.4 ml of distilled water in 72 ml of 2-methoxy-1-ethanol. Its apparent pH was determined as in example 3: pH=8.2.

The entire amount of organic solution of water was poured into the organic solution of the alcoholate which was maintained stirred at ambient temperature.

After a maturing period of 15 minutes, the reaction medium coagulated in the form of a transparent gel.

Examples 3 and 4 show that, when an alcohol with a pKa less than 15.74 is chosen for the organic solution of the metal alcoholate, it is no longer necessary to add an inorganic acid in order to obtain a gel by hydrolysis.

Example 5

The organic solution of the metal alcoholate was obtained by dissolving secondary butylate of aluminum in 2-methoxy-1-ethanol, at a rate of 0.5 mol of aluminium butylate per liter of solution.

The organic solution of water was obtained by diluting 0.4 ml of distilled water in 19.6 ml of propanol. Its apparent pH was determined, as in example 3: pH=7.8.

30 ml of the organic solution of alcoholate, preheated to 60° C., were employed, and the entire amount of the organic solution of water was added to it slowly. The resulting mixture was poured into a mould which was introduced into an oven in which a temperature of 60° C. was maintained. In the oven, the mould was kept open to allow the solvents to evaporate. The reaction mixture coagulated in the form of a transparent gel.

What is claimed is:

1. Process for the manufacture of vitreous metal oxides, comprising:

dissolving a metal alcoholate in an alcohol having a pKa which is less than 15.74 to provide an alcoholic solution;

preparing an aqueous medium having a pH which is greater than 1.5 by dissolving water in an organic solvent therefor; and mixing together the alcoholic solution and the aqueous medium under conditions effective to hydrolyze the metal alcoholate to form a metal oxide and to cause gelling of the metal oxide.

2. Process according to claim 1, wherein the metal alcoholate is derived from an alcohol, the pKa value of which is not greater than 15.25, and wherein the aqueous medium has a pH which is at least equal to 2.

3. Process according to claim 2, wherein the metal alcoholate is derived from an alcohol, the pKa value of which ranges between 12 and 15.

4. Process according to claim 1, wherein the metal alcoholate is chosen from alcoholates of metals of groups III A and IV B of the periodic table of elements.

5. Process according to claim 1, wherein the metal alcoholate is chosen from those derived from compounds having a general formula:

R—O—R'OH in which R and R' denote hydrocarbon groups.

6. Process according to claim 5, wherein the metal alcoholate is chosen from alkoxy alcoholates.

7. Process according to claim 1, wherein mixing is accomplished by pouring the aqueous medium into the alcoholic solution of the metal alcoholate.

8. Process according to claim 7, wherein the metal alcoholate is derived from an alcohol, the pKa of which is greater than 15.74.

9. Process according to claim 8, wherein the alcohol of the alcoholic solution, the pKa of which is less than 15.74, is chosen from ether-alcohols having a general formula:

R—O—R'OH in which R and R' denote hydrocarbon groups.

10. Process according to claim 9, wherein the alcohol of the alcoholic solution, the pKa of which is less than 15.74, is an ether-alcohol in which R and R' are saturated aliphatic groups, and wherein the alcohol, the pKa of which is greater than 15.74, is chosen from saturated aliphatic alcohols.

11. Process according to claim 1, wherein the metal alcoholate is derived from an alcohol, the pKa of which is greater than 15.74, and wherein mixing is accomplished by pouring the aqueous medium into the alcoholic solution of the metal alcoholate.

12. Process according to claim 1, wherein the aqueous medium contains up to 0.0005 mole of an inorganic acid per mole of water.

* * * * *